(12) United States Patent
Ahn et al.

(10) Patent No.: US 9,412,520 B2
(45) Date of Patent: Aug. 9, 2016

(54) MULTILAYER CERAMIC ELECTRONIC COMPONENT

(71) Applicant: SAMSUNG ELECTRO-MECHANICS CO., LTD., Suwon-Si, Gyeonggi-Do (KR)

(72) Inventors: Young Ghyu Ahn, Suwon-Si (KR); Byoung Hwa Lee, Suwon-Si (KR); Sang Soo Park, Suwon-Si (KR); Heung Kil Park, Suwon-Si (KR); Soon Ju Lee, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 103 days.

(21) Appl. No.: 14/529,051

(22) Filed: Oct. 30, 2014

(65) Prior Publication Data

US 2016/0027583 A1    Jan. 28, 2016

(30) Foreign Application Priority Data

Jul. 25, 2014   (KR) .......................... 10-2014-0095048

(51) Int. Cl.
*H01G 4/228*   (2006.01)
*H01G 4/30*   (2006.01)
*H01G 4/012*   (2006.01)
*H01G 4/12*   (2006.01)
*H01G 4/248*   (2006.01)

(52) U.S. Cl.
CPC ................. *H01G 4/30* (2013.01); *H01G 4/012* (2013.01); *H01G 4/12* (2013.01); *H01G 4/248* (2013.01)

(58) Field of Classification Search
CPC ...................................................... H01G 4/232
USPC ............................................ 361/306.3, 301.4
See application file for complete search history.

(56) References Cited

U.S. PATENT DOCUMENTS

| | | | | | |
|---|---|---|---|---|---|
| 6,071,800 | A | * | 6/2000 | Shigemoto | H01G 4/232 257/762 |
| 6,252,481 | B1 | * | 6/2001 | Iwao | H01F 27/292 336/200 |
| 8,837,112 | B2 | * | 9/2014 | Gu | H01G 4/12 361/301.2 |
| 8,861,180 | B2 | * | 10/2014 | Lee | H01G 4/008 361/301.2 |

(Continued)

FOREIGN PATENT DOCUMENTS

| | | |
|---|---|---|
| JP | 06-215978 A | 8/1994 |
| JP | 2008-085280 A | 4/2008 |
| JP | 2008-112759 A | 5/2008 |
| JP | 2010-123647 A | 6/2010 |

(Continued)

OTHER PUBLICATIONS

Notice of Office Action issued in corresponding Japanese Patent Application No. 2014-205448, mailed on Jan. 12, 2016; with English translation.

*Primary Examiner* — Eric Thomas
(74) *Attorney, Agent, or Firm* — McDermott Will & Emery LLP

(57) ABSTRACT

A multilayer ceramic electronic component may include: a ceramic body in which a plurality of internal electrodes and a plurality of dielectric layers are stacked in a thickness direction; and an external electrode including an electrode layer disposed on an outer surface of the ceramic body to be connected to the internal electrodes, a conductive resin layer disposed on the electrode layer and containing metal particles and a base resin, and a plating layer disposed on the conductive resin layer.

13 Claims, 4 Drawing Sheets

(56) References Cited

U.S. PATENT DOCUMENTS

| | | | |
|---|---|---|---|
| 8,861,181 B2 * | 10/2014 | Lee | H01G 4/008 361/301.2 |
| 2008/0073108 A1 | 3/2008 | Saito et al. | |
| 2013/0242457 A1 | 9/2013 | Lee et al. | |
| 2013/0319741 A1 | 12/2013 | Ahn et al. | |

FOREIGN PATENT DOCUMENTS

| | | |
|---|---|---|
| JP | 2011-138704 A | 7/2011 |
| JP | 2011-233452 A | 11/2011 |
| KR | 10-0586962 B1 | 6/2006 |
| KR | 10-1309479 B1 | 9/2013 |
| KR | 2013-0104360 A | 9/2013 |

* cited by examiner

MULTILAYER CERAMIC ELECTRONIC COMPONENT

CROSS-REFERENCE TO RELATED APPLICATION

This application claims the benefit of Korean Patent Application No. 10-2014-0095048 filed on Jul. 25, 2014, with the Korean Intellectual Property Office, the disclosure of which is incorporated herein by reference.

BACKGROUND

The present disclosure relates to a multilayer ceramic electronic component.

A multilayer ceramic electronic component may include a plurality of stacked dielectric layers, internal electrodes disposed to face each other with each of the dielectric layers interposed therebetween, and external electrodes electrically connected to the internal electrodes.

As electronic products are miniaturized and multi-functionalized, chip components also tend to be miniaturized and multi-functionalized. Therefore, a small sized multilayer ceramic electronic component having high capacitance has been demanded.

To this end, a multilayer ceramic electronic component in which a large number of dielectric layers are stacked by decreasing thicknesses of the dielectric layer and internal electrode layers has been manufactured, and the external electrodes have also been thinned.

In addition, as various fields of application requiring high reliability, such as vehicles or medical devices, are digitalized and demands thereof are increased, high reliability is also required in the multilayer ceramic electronic component.

Infiltration of a plating solution generated at the time of performing a process, crack generation by external impacts, and the like, may cause defects in high reliability.

Therefore, as a means for solving the defects, a resin composition containing a conductive material is applied onto an electrode layer of the external electrode to absorb the external impacts and prevent the infiltration of the plating solution, thereby improving reliability.

RELATED ART DOCUMENT (Patent Document 1) Korean Patent No. 10-0586962

SUMMARY

Some exemplary embodiments in the present disclosure may provide a multilayer ceramic electronic component.

According to some exemplary embodiments in the present disclosure, a multilayer ceramic electronic component may include a ceramic body including a plurality of internal electrodes and a plurality of dielectric layers; and an external electrode including an electrode layer disposed on an outer surface of the ceramic body to be connected to the internal electrodes, a conductive resin layer disposed on the electrode layer and containing a plurality of metal particles and a base resin, and a plating layer disposed on the conductive resin layer.

According to some exemplary embodiment in the present disclosure, regions and distribution occupied by the metal particles and the base resin contained in the conductive resin layer may be controlled, such that a multilayer ceramic electronic component having high reliability and allowing for low equivalent series resistance may be provided.

In the multilayer ceramic electronic component according to an exemplary embodiment in the present disclosure, in the case that a shortest distance from a point at which among the internal electrodes, an outermost internal electrode in the stacking direction and the electrode layer are connected to each other to an outer surface of the external electrode is defined as a, a virtual straight line forming the shortest distance is present, a distance of a region of the straight line passing through the conductive resin layer is defined as b, a distance of a region of the straight line passing through the electrode layer is defined as c, and a sum of distances of regions of the straight line passing through the metal particles contained in the conductive resin layer is defined as bm, $0.250 \leq \{(2b+c)/a\} \times \{1-(bm/b)\}^{1/2} \leq 0.605$ may be satisfied.

BRIEF DESCRIPTION OF DRAWINGS

The above and other aspects, features and other advantages in the present disclosure will be more clearly understood from the following detailed description taken in conjunction with the accompanying drawings, in which.

DETAILED DESCRIPTION

Figure 1:
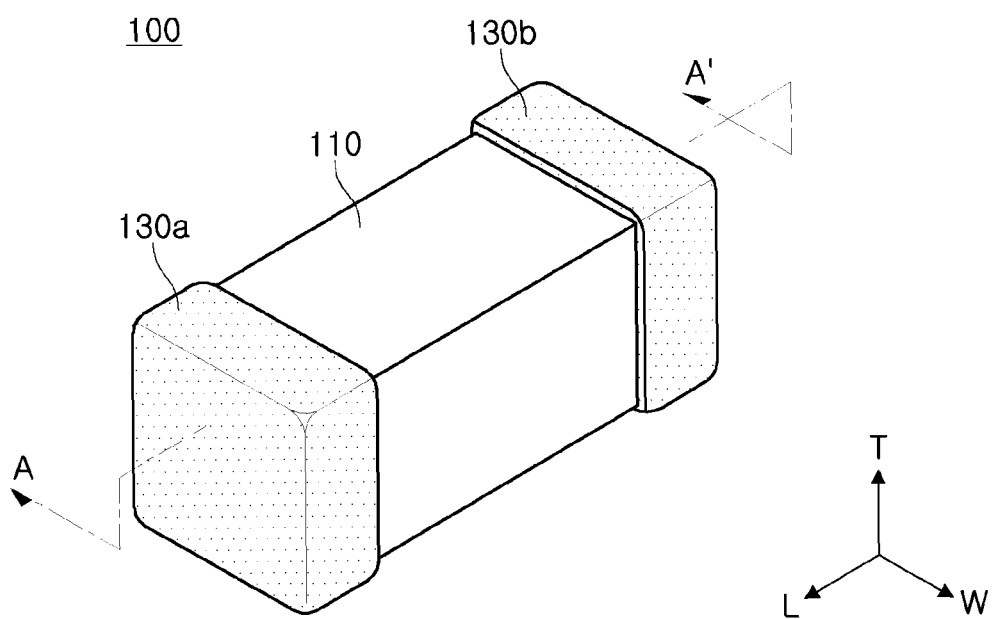
FIG. 1 is a perspective view schematically illustrating a multilayer ceramic electronic component according to an exemplary embodiment in the present disclosure.

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

A multilayer ceramic electronic component according to an exemplary embodiment in the present disclosure may be appropriately used in a multilayer ceramic capacitor, a multilayer varistor, a thermistor, a piezoelectric element, a multilayer substrate, or the like, using dielectric layers and having a structure in which internal electrodes face each other with each of the dielectric layers interposed therebetween.

Figure 2:
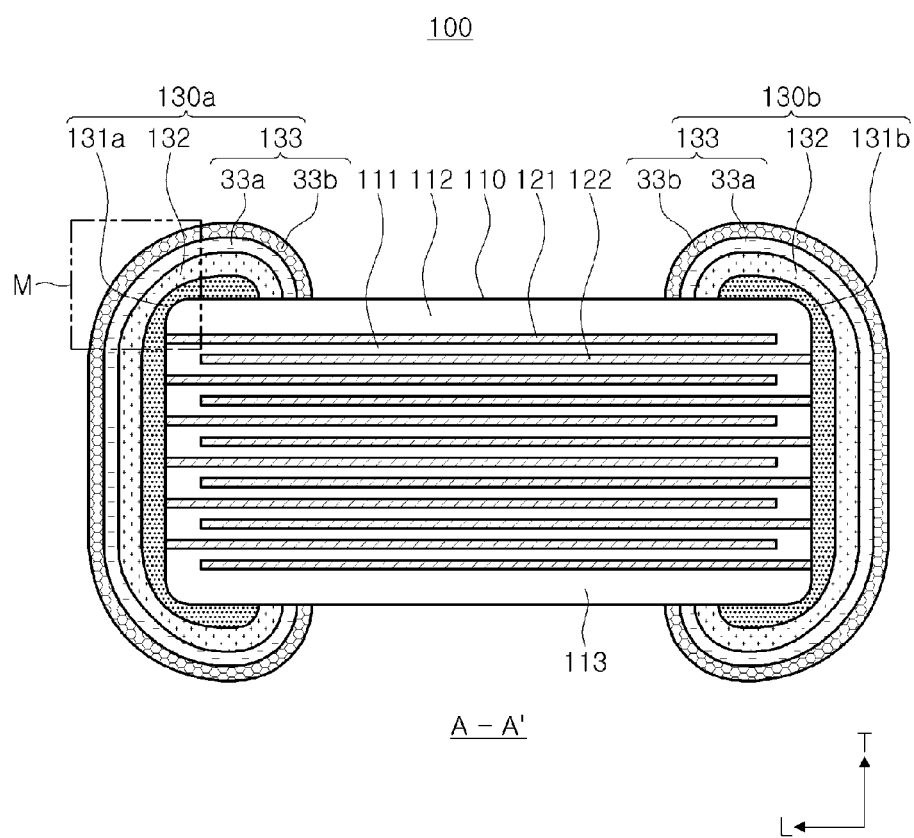
FIG. 2 is a cross-sectional view taken along line A-A' of FIG. 1.

FIG. 1 is a perspective view illustrating a multilayer ceramic electronic component 100 according to an exemplary embodiment in the present disclosure, and FIG. 2 is a cross-sectional view taken along line A-A' of FIG. 1.

Referring to FIGS. 1 and 2, the multilayer ceramic electronic component 100 according to an exemplary embodiment in the present disclosure may include a ceramic body 110; and external electrodes 130a and 130b.

The ceramic body 110 may include an active layer as a portion contributing to capacitance formation of a capacitor and upper and lower cover parts 112 and 113 disposed on upper and lower portions of the active layer, respectively, as upper and lower margin parts, and the active layer may include dielectric layers 111 and internal electrodes 121 and 122.

In an exemplary embodiment in the present disclosure, a shape of the ceramic body 110 is not particularly limited, but may be substantially a hexahedral shape. A difference in a thickness is generated according to the sintering shrinkage of a ceramic powder during a sintering process and the presence or absence of an internal electrode pattern, and edge parts of the ceramic body are polished, such that the ceramic body 110 does not have a perfect hexahedral shape but may have a shape substantially close to a hexahedral shape.

Directions of a hexahedron will be defined in order to clearly describe exemplary embodiments in the present disclosure. L, W and T shown in the accompanying drawings refer to a length direction, a width direction, and a thickness direction, respectively. Here, the thickness direction may be used to have the same concept as a stacking direction in which the dielectric layers are stacked.

The internal electrodes 121 and 122 may be composed of first and second internal electrodes 121 and 122, and the first and second internal electrodes may be disposed to face each other with each of the dielectric layers 111 interposed therebetween and one ends of the first and second internal electrodes 121 and 122 may be alternately exposed to both end surfaces of the ceramic body opposing each other.

The first and second internal electrodes 121 and 122, a pair of electrodes having different polarities from each other, may be formed by printing a conductive paste containing a conductive metal on the dielectric layers 111 at a predetermined thickness so as to be alternately exposed to both end surfaces of the ceramic body in the stacking direction of the dielectric layers 111, and be electrically insulated from each other by the dielectric layers 111 disposed therebetween.

The first and second internal electrodes 121 and 122 may be electrically connected to the external electrodes 130a and 130b through portions thereof alternately exposed to both end surfaces of the ceramic body 110. For example, the external electrodes may include first and second external electrodes 130a and 130b, the first internal electrode may be electrically connected to the first external electrode 130a, and the second internal electrode may be electrically connected to the second external electrode 130b.

Therefore, when voltage is applied to the first and second external electrodes 130a and 130b, electric charges are accumulated between the first and second internal electrodes 121 and 122 facing each other. In this case, capacitance of the multilayer ceramic electronic component 100 may be in proportion to an area of an overlapped region between the first and second internal electrodes 121 and 122.

A thickness of the first and second internal electrodes 121 and 122 as described above may be determined according to the use thereof.

Further, the conductive metal contained in the first and second internal electrodes 121 and 122 may be nickel (Ni), copper (Cu), palladium (Pd), or an alloy thereof, but the present disclosure is not limited thereto.

In this case, a thickness of the dielectric layers 111 may be optionally changed according to a capacitance design of the multilayer ceramic capacitor.

Further, the dielectric layers 111 may contain a ceramic powder having high permittivity, for example, a barium titanate ($BaTiO_3$) based powder or strontium titanate ($SrTiO_3$) based powder, or the like, but the present disclosure is not limited thereto.

The upper and lower cover parts 112 and 113 may have the same material and configuration as those of the dielectric layers 111 except that the internal electrodes are not included therein. The upper and lower cover parts 112 and 113 may be formed by stacking a single or two or more dielectric layers on upper and lower surfaces of the active layer in a vertical direction, respectively, and may serve to prevent the first and second internal electrodes 121 and 122 from being damaged by physical or chemical stress.

According to an exemplary embodiment in the present disclosure, the external electrodes 130a and 130b may include electrode layers 131a and 131b, conductive resin layers 132 disposed on the electrode layers, and plating layers 133 disposed on the conductive resin layers 132.

The external electrodes may include the first and second external electrodes, and the electrode layers may include first and second electrode layers.

For example, the first external electrode 130a may include the first electrode layer 131a, the conductive resin layer 132, and the plating layer 133, and the second external electrode 130b may include the second electrode layer 131b, the conductive resin layer 132, and the plating layer 133.

The first and second electrode layers 131a and 131b may be directly connected to the first and second internal electrodes 121 and 122 to secure electrical connection between the external electrodes and the internal electrodes.

The first and second electrode layers 131a and 131b may contain a conductive metal and further contain a glass component as needed. The conductive metal may be nickel (Ni), copper (Cu), palladium (Pd), gold (Au) or an alloy thereof, but the present disclosure is not limited thereto.

The glass component may be a $SiO_2$ based glass component or a $B_2O_3$ based glass component or contain both of $SiO_2$ and $B_2O_3$, but is not limited thereto.

For example, the glass component may contain an $aSiO_2$-$bB_2O_3$-$cR^1_2O$ or $SiO_2$-$bB_2O_3$-$dR^2O$ composition, but is not limited thereto. In this case, $R^1$ may be selected from the group consisting of lithium (Li), sodium (Na), and potassium (K), $R^2$ may be selected from the group consisting of magnesium (Mg), calcium (Ca), strontium (Sr), and barium (Ba), and a, b, c, and d may be suitably adjusted according to desired physical properties of the glass component.

The first and second electrode layers 131a and 131b may be sintered electrodes formed by sintering a paste containing the conductive metal and the glass component. The glass component may be contained in the paste in a glass frit form.

The conductive resin layers 132 may be disposed on the first and second electrode layers 131a and 131b.

For example, the first and second electrode layers 131a and 131b may be disposed on outer surfaces of the ceramic body, and the conductive resin layers 132 may be disposed on outer portions of the first and second electrode layers. The plating layers 133 may be disposed on outer portions of the conductive resin layers 132.

In the present specification, a portion adjacent to the ceramic body 110 may be defined as an inner portion based on the external electrode, and a portion opposite to the inner portion may be defined as an outer portion.

Figure 3:
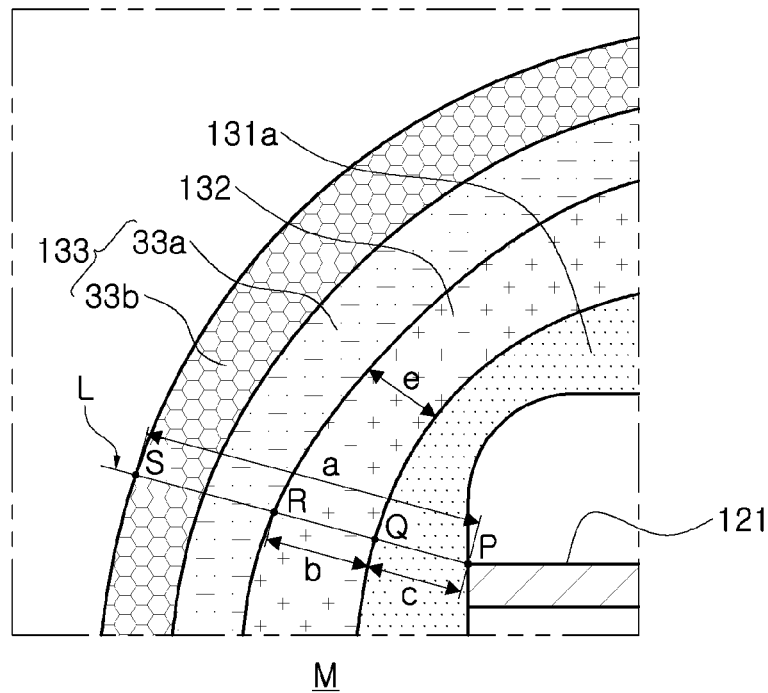
FIG. 3 is an enlarged view of portion M of FIG. 2.
Figure 4:
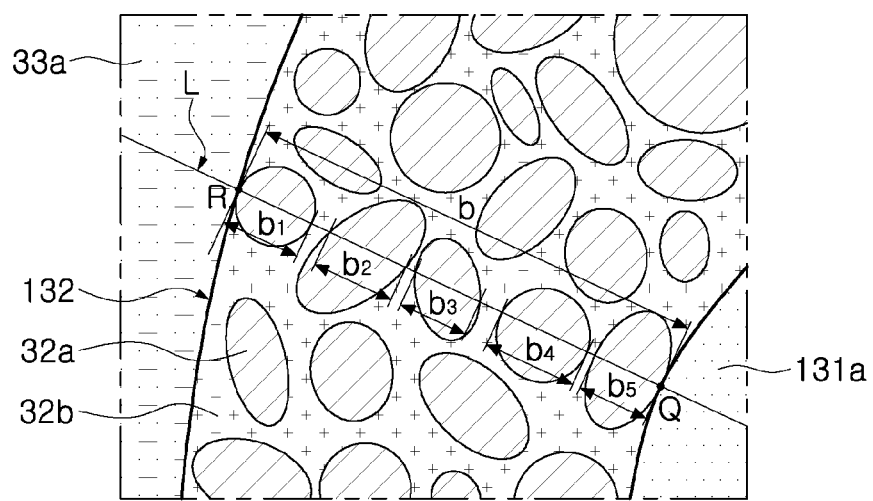
FIG. 4 is an enlarged view of a conductive resin layer according to an exemplary embodiment in the present disclosure.

FIG. 3 is an enlarged view of portion M of FIG. 2. FIG. 4 is an enlarged view of the conductive resin layer 132 according to an exemplary embodiment in the present disclosure.

Referring to FIGS. 3 and 4, the conductive resin layer 132 may contain metal particles 32a and a base resin 32b. The conductive resin layer may be formed of a conductive paste for an external electrode containing the metal particles and the base resin.

The conductive resin layer may contain a plurality of metal particles and the metal particles may have a spherical or flake shape.

The metal particles 32a may contact each other or be disposed to be adjacent to each other in the conductive resin layer 132, and the base resin 32b may be disposed so as to enclose the metal particles.

The metal particles 32a are not particularly limited as long as they are particles of a metal having excellent conductivity. For example, the metal particles 32a may contain copper (Cu), silver (Ag), nickel (Ni), and an alloy thereof.

The base resin 32b is a thermosetting resin, the base resin contained in the conductive paste for an external electrode may be a base resin before the curing thereof, and the base resin contained in the conductive resin layer may be a base resin after the curing thereof.

The thermosetting resin may be an epoxy resin.

The conductive resin layers 132 disposed on the first and second electrode layers may serve to protect the multilayer ceramic electronic component from external thermal, chemical, and physical stress and to increase bending strength of the multilayer ceramic electronic component.

For example, the conductive resin layers may prevent moisture from infiltrating into the ceramic body and prevent a plating solution from infiltrating into the ceramic body at the time of forming the plating layers 133. In the case in which the plating solution or moisture infiltrates into the ceramic body, reliability of the multilayer ceramic electronic component may be deteriorated.

Hereinafter, an exemplary embodiment in the present disclosure will be described in detail through a dimensional relationship between constitutions contained in the external electrodes of the multilayer ceramic electronic component according to an exemplary embodiment in the present disclosure with reference to FIGS. 3 and 4.

According to an exemplary embodiment in the present disclosure, in a cross-section of the multilayer ceramic electronic component in a length-thickness (L-T) direction cut in a central portion thereof in the width (W) direction, in the case that a shortest distance from a point P at which among the internal electrodes 121 and 122, an outermost internal electrode in the stacking direction and the electrode layer 131a or 131b are connected to each other to an outer surface of the external electrode 130a or 130b is defined as a, a virtual straight line L forming the shortest distance from the point P at which among the internal electrodes 121 and 122, the outermost internal electrode in the stacking direction and the electrode layer 131a or 131b are connected to each other to the outer surface of the external electrode 130a or 130b is present, a distance of a region of the straight line L passing through the conductive resin layer 132 is defined as b, a distance of a region of the straight line L passing through the electrode layer 131a or 131b is defined as c, and a sum of distances of regions of the straight line L passing through the metal particles contained in the conductive resin layer 132 is defined as bm, the dimensional relationship between the constitutions included in the external electrodes 130a and 130b may satisfy the following Equation (hereinafter, Correlation Equation 1): $0.250 \leq \{(2b+c)/a\} \times \{1-(bm/b)\}^{1/2} \leq 0.605$.

The point P is a point at which an outer surface of an internal electrode disposed at the outermost layer in the stacking direction among the internal electrodes 121 and 122 is connected to the electrode layer 131a or 131b as shown in FIG. 3.

The outer surface of the internal electrode disposed at the outermost layer in the stacking direction means a surface thereof disposed to be closer to the outer surface of the ceramic body 110.

In addition, when a point at which the virtual straight line L contacts the outer surface of the external electrode 130a or 130b is defined as S, a point at which the virtual straight line L contacts an outer surface of the electrode layer 131a or 131b is defined as Q, and a point at which the straight line L contacts an outer surface of conductive resin layer 132 is defined as R, the distance a may mean a distance between P and S, the distance b may mean a distance between Q and R, and the distance c may mean a distance between P and Q.

In the cross-section of the multilayer ceramic electronic component in the length-thickness (L-T) direction, the point at which among the internal electrodes 121 and 122, the outermost internal electrode in the stacking direction and the electrode layer 131a or 131b are connected to each other may be defined as P, the shortest distance from the point P to the outer surface of the external electrode 130a or 130b may be defined as a, the point at which the virtual straight line L forming the shortest distance contacts the outer surface of the electrode layer 131a or 131b may be defined as Q, the point at which the straight line L contacts the outer surface of the conductive resin layer 132 may be defined as R, the distance between the points P and Q may be defined as C, and the distance between the points Q and R may be defined as b.

The bm may mean the sum of the distances of the regions of the straight line L passing through the metal particles 32a contained in the conductive resin layer 132. For example, bm may be defined as a sum of distances of regions of the straight line L crossing the plurality of metal particles 32a. For example, as shown in FIG. 4, bm may be a sum of $b_1$, $b_2$, $b_3$, $b_4$, and $b_5$.

In the case in which $\{(2b+c)/a\} \times \{1-(bm/b)\}^{1/2}$ is less than 0.250, reliability of the multilayer ceramic electronic component may be deteriorated, and in the case in which $\{(2b+c)/a\} \times \{1-(bm/b)\}^{1/2}$ is greater than 0.605, a thickness of the conductive resin layer in the external electrode is increased, such that equivalent series resistance (ESR) may be significantly increased.

Reliability of the multilayer ceramic electronic component may be affected by a thickness of the external electrode measured at the point P at which the outermost internal electrode and the electrode layer meet each other in a straight line L direction, and particularly, the thickness of the external electrode measured at the point P at which the outermost internal electrode and the electrode layer meet each other in the straight line L direction may be deeply associated with infiltration of the plating solution.

Further, in the case of applying the conductive resin layer onto the electrode layer in order to prevent deterioration of reliability, an influence of b corresponding to a thickness occupied by the conductive resin layer in the straight line L on the reliability may be at least about two times larger than an influence of c corresponding to a thickness occupied by the electrode layer in the straight line L on the reliability.

In addition, a ratio (1−bm/b) of the base resin except for the metal particles in the conductive resin layer may be associated with reliability, and experimentally, it may be confirmed that the reliability is affected by $\{1-(bm/b)\}^{1/2}$.

Considering the factors as described above, it may be confirmed that finally, reliability of the multilayer ceramic electronic component may be associated with $\{(2b+c)/a\} \times \{1-(bm/b)\}^{1/2}$, and according to an exemplary embodiment in the present disclosure, in order to prevent deterioration of reliability, $\{(2b+c)/a\} \times \{1-(bm/b)\}^{1/2}$ may be 0.250 or more.

According to an exemplary embodiment in the present disclosure, a thickness e of a corner portion of the conductive resin layer 132 may be 1.7 μm or more.

In the case in which the thickness of the corner portion of the conductive resin layer is less than 1.7 μm, reliability of the multilayer ceramic electronic component may be deteriorated.

In order to control an equivalent series resistance (ESR), the thickness of the corner portion of the conductive resin layer may be 100.5 μm or less, but is not limited thereto.

As shown in FIG. 3, the corner portion of the conductive resin layer 132 may mean a region corresponding to a corner portion of the ceramic body 110 in the cross-section of the multilayer ceramic electronic component in the length-thickness (L-T) direction. In other words, the corner portion of the conductive resin layer may mean a region of the conductive resin layer disposed on the electrode layer disposed on the corner portion of the ceramic body.

The plating layer 133 may be disposed on the conductive resin layer 132 and include a first plating layer 33a containing nickel and a second plating layer 33b containing tin. The first plating layer 33a may be disposed on the conductive resin layer 132, and the second plating layer 33b may be disposed on the first plating layer 33a.

Figure 5:
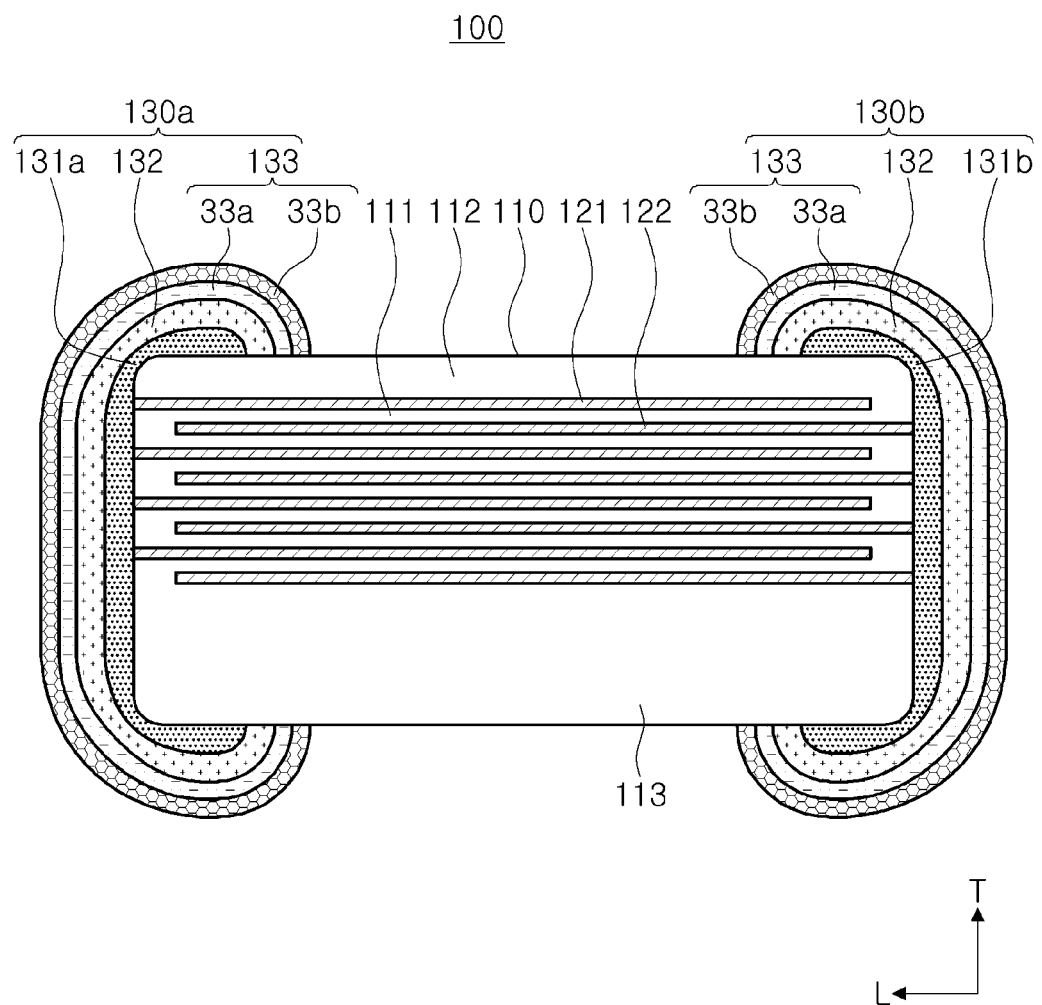
FIG. 5 is a cross-sectional view schematically illustrating a modified example of the multilayer ceramic electronic component according to an exemplary embodiment in the present disclosure.

FIG. 5 is a cross-sectional view schematically illustrating a modified example of the multilayer ceramic electronic component according to an exemplary embodiment in the present disclosure.

As shown in FIG. 5, according to an exemplary embodiment in the present disclosure, the lower cover part 113 disposed on a lower portion of an active layer may have a thickness greater than that of the upper cover part 112 disposed on an upper portion of the active layer in a ceramic body.

The thickness of the lower cover part 113 may mean a distance from a lower surface of the second internal electrode 122 formed at a lowermost portion of the active layer in the thickness direction to a lower surface of the ceramic body 110, and the thickness of the upper cover part 112 may mean a distance from an upper surface of the first internal electrode 121 formed at an uppermost portion of the active layer in the thickness direction to an upper surface of the ceramic body 110.

The lower cover part 113 may have a thickness greater than that of the upper cover part 112 by further increasing the number of stacked dielectric layers.

When voltages having different polarities are applied to the first and second electrodes disposed on both end portions of the multilayer ceramic capacitor, the ceramic body may be expanded and contracted in the thickness direction by an inverse piezoelectric effect of the dielectric layer, and both end portions of the first and second external electrodes may be contracted and expanded as opposed to expansion and contraction of the ceramic body in the thickness direction by a poisson effect.

Here, regions of the first and second external electrodes corresponding to a central portion of the active layer, which are portions maximally expanded and contracted, may cause acoustic noise.

As in the modified example, the lower cover part 113 has a thickness greater than that of the upper cover part 112, such that the region of the external electrode maximally expanded and contracted may be increased. Therefore, in the case of mounting the multilayer ceramic capacitor on a board, acoustic noise may be decreased.

In the modified example, in order to improve an acoustic noise decreasing effect and to increase a capacitance implementation rate, when half of the overall thickness of the ceramic body is defined as A, the thickness of the lower cover part is defined as B, half of the overall thickness of the active layer is defined as C, and the thickness of the upper cover part is defined as D, a ratio of the central portion of the active layer deviated from a central portion the ceramic body, that is, $(B+C)/A$ may satisfy the following Equation: $1.066 \leq (B+C)/A \leq 1.747$, but the present disclosure is not limited thereto.

Further, a ratio of the thickness D of the upper cover part to the thickness B of the lower cover part, that is, D/B may satisfy the following Equation: $0.022 \leq D/B \leq 0.433$.

In addition, a ratio of the thickness B of the lower cover part 113 to the half A of the thickness of the ceramic body, that is, B/A may satisfy the following Equation: $0.222 \leq B/A \leq 1.524$.

In addition, a ratio of the half C of the thickness of the active layer to the thickness B of the lower cover part, that is, C/B may satisfy the following Equation: $0.146 \leq C/B \leq 3.805$.

Further, a marking for distinguishing upper and lower portions may be disposed on at least one of the upper and lower surfaces of the ceramic body.

Since other features of the multilayer ceramic capacitor according to the present modified example are the same as those of the above-mentioned multilayer ceramic capacitor according to an exemplary embodiment in the present disclosure, a detailed description thereof will be omitted.

Experimental Example

Multilayer ceramic capacitors according to Inventive Examples and Comparative Examples in the present disclosure were manufactured as follows.

Slurry containing powder such as a barium titanate (BaTiO$_3$) powder, or the like, was applied and dried onto carrier films, thereby preparing a plurality of ceramic green sheets having a thickness of 1.68 μm.

Then, an internal electrode pattern was formed by applying a conductive paste for an internal electrode containing nickel onto the ceramic green sheets by a screen printing method.

A multilayer body obtained by stacking about 460 ceramic green sheets was isostatically pressed at 85° C. and a pressure condition of 1000 kgf/cm$^2$. A ceramic multilayer body subjected to the isostatic pressing was cut into an individual chip form so that one ends of the internal electrode patterns were alternately exposed to cutting surfaces, and the cut chip was subjected to a de-binding process after being maintained at 230☐ for 60 hours under air atmosphere.

Then, a ceramic body was prepared by sintering the chip at 1200☐ under reduction atmosphere having oxygen partial pressure of $10^{-11}$ atm to $10^{-10}$ atm lower than Ni—NiO equilibrium oxygen partial pressure so that internal electrode was not oxidized. After sintering, a size of the ceramic body was about 1.64 mm×0.88 mm×0.88 mm (length×width×thickness (L×W×T), 1608 size).

Next, a paste containing a copper powder and glass frits was applied onto an outer surface of the ceramic body to which the internal electrode was exposed and sintered at about 700° C. for about 2 hours, thereby forming an electrode layer. After forming the electrode layer, a conductive paste containing metal particles and an epoxy resin was applied onto the electrode layer, and the epoxy resin was thermally cured by maintaining the applied conductive paste at about 250° C. for 12 hours, thereby forming a conductive resin layer. After forming the conductive resin layer, a first plating layer containing nickel and a second plating layer containing tin were formed, and reliability failure and equivalent series resistance (ESR) were measured.

TABLE 1

| Sample | a (μm) | b (μm) | c (μm) | bm (μm) | {(2b + c)/a} × {1 − (bm/b)}$^{1/2}$ | Reliability failure Rate | ESR (mΩ) |
|---|---|---|---|---|---|---|---|
| 1* | 12.5 | 1.54 | 1.66 | 1.35 | 0.134 | 9/800 | 7.3 |
| 2* | 11.9 | 1.61 | 1.74 | 1.18 | 0.215 | 4/800 | 10.3 |
| 3* | 14.1 | 1.60 | 3.45 | 1.41 | 0.163 | 4/800 | 7.4 |
| 4* | 14.3 | 1.64 | 3.63 | 1.37 | 0.196 | 1/800 | 12.4 |
| 5* | 15.6 | 3.74 | 1.78 | 3.33 | 0.197 | 1/800 | 9.4 |
| 6 | 15.2 | 3.73 | 1.82 | 2.95 | 0.280 | 0/800 | 11.8 |
| 7 | 16.5 | 3.82 | 3.61 | 3.31 | 0.250 | 0/800 | 9.7 |
| 8 | 17.2 | 4.05 | 3.43 | 3.15 | 0.316 | 0/800 | 13.2 |
| 9 | 18.4 | 7.83 | 1.93 | 5.94 | 0.471 | 0/800 | 11.8 |
| 10 | 19.2 | 7.72 | 1.90 | 5.37 | 0.498 | 0/800 | 12.7 |
| 11 | 20.1 | 7.94 | 3.92 | 6.18 | 0.463 | 0/800 | 11.9 |
| 12 | 19.1 | 7.95 | 3.86 | 5.59 | 0.564 | 0/800 | 13.4 |
| 13 | 21.1 | 7.72 | 5.24 | 5.73 | 0.498 | 0/800 | 13.0 |
| 14 | 21.4 | 7.79 | 5.55 | 5.57 | 0.528 | 0/800 | 13.9 |
| 15 | 28.5 | 11.6 | 7.75 | 8.01 | 0.605 | 0/800 | 14.4 |
| 16* | 31.9 | 13.1 | 10.42 | 8.64 | 0.669 | 0/800 | 24.8 |
| 17* | 32.7 | 15.4 | 9.47 | 9.82 | 0.740 | 0/800 | 26.7 |

*Comparative Example

Data of the [Table 1] were obtained by measuring each dimension based on a photograph obtained by scanning a cross-section of the multilayer ceramic electronic component in the length-thickness (L-T) direction, taken along a central portion of the multilayer ceramic electronic component in a width (W) direction using a scanning electron microscope (SEM) as shown in FIG. 2.

Here, as described above, a, b, c, and bm were defined as follows. A shortest distance from a point at which among the internal electrodes, an internal electrode disposed at an outermost layer in a stacking direction and the electrode layer were connected to each other to an outer surface of the external electrode was defined as a, it was assumed that a virtual straight line L forming the shortest distance from the point at which among the internal electrodes, the internal electrode disposed at the outermost layer in the stacking direction and the electrode layer were connected to each other to the outer surface of the external electrode was present, a distance of a region of the straight line L passing through the conductive resin layer was defined as b, a distance of a region of the straight line L passing through the electrode layer was defined as c, and a sum of distances of regions of the straight line L passing through the metal particles contained in the conductive resin layer was defined as bm.

In the Experimental Example, when a voltage (10V) was applied to the multilayer ceramic electronic component and was maintained at about 85° C. and a relative humidity of 85% for 100 hours, the case in which an insulation resistance was rapidly decreased to thereby be 1/10 or less of an initial insulation resistance was determined as the reliability failure.

In [Table 1], samples 1 to 5 were Comparative Examples corresponding to cases in which $\{(2b+c)/a\} \times \{1-(bm/b)\}^{1/2}$ was less than 0.250, and samples 16 and 17 were Comparative Examples corresponding to cases in which $\{(2b+c)/a\} \times \{1-(bm/b)\}^{1/2}$ was greater than 0.605.

Samples 6 to 15 were Inventive Examples in the present disclosure, and in samples 6 to 15, $\{(2b+c)/a\} \times \{1-(bm/b)\}^{1/2}$ was 0.250 to 0.605.

As shown in Table 1, it may be appreciated that in the case in which $\{(2b+c)/a\} \times \{1-(bm/b)\}^{1/2}$ was less than 0.250, reliability failure occurred, and in the case in which $\{(2b+c)/a\} \times \{1-(bm/b)\}^{1/2}$ was greater than 0.605, the ESR value was rapidly increased. Further, in samples 16 and 17 in which $\{(2b+c)/a\} \times \{1-(bm/b)\}^{1/2}$ was greater than 0.605, the ESR was more than 20 mΩ at a resonance frequency, there was a limitation in set application.

As set forth above, according to exemplary embodiments in the present disclosure, the multilayer ceramic electronic component having high reliability while allowing for low equivalent series resistance may be provided.

While exemplary embodiments have been shown and described above, it will be apparent to those skilled in the art that modifications and variations could be made without departing from the scope of the invention as defined by the appended claims.

What is claimed is:

1. A multilayer ceramic electronic component comprising: a ceramic body including a plurality of internal electrodes and a plurality of dielectric layers; and an external electrode including an electrode layer disposed on an outer surface of the ceramic body to be connected to the internal electrodes, a conductive resin layer disposed on the electrode layer and containing a plurality of metal particles and a base resin, and a plating layer disposed on the conductive resin layer, wherein in the case that a shortest distance from a point at which among the internal electrodes, an outermost internal electrode in the stacking direction and the electrode layer are connected to each other to an outer surface of the external electrode is defined as a, a virtual straight line forming the shortest distance is present, a distance of a region of the straight line passing through the conductive resin layer is defined as b, a distance of a region of the straight line passing through the electrode layer is defined as c, and a sum of distances of regions of the straight line passing through the metal particles contained in the conductive resin layer is defined as bm, $0.250 \leq \{(2b+c)/a\} \times \{1-(bm/b)\}^{1/2} \leq 0.605$ is satisfied.

2. The multilayer ceramic electronic component of claim 1, wherein a corner portion of the conductive resin layer has a thickness of 1.7 μm or more.

3. The multilayer ceramic electronic component of claim 1, wherein the internal electrodes include first and second internal electrodes having one ends alternately exposed to both end surfaces of the ceramic body opposing each other.

4. The multilayer ceramic electronic component of claim 1, wherein the metal particles have a spherical or flake shape.

5. The multilayer ceramic electronic component of claim 1, wherein the plating layer includes a first plating layer disposed on the conductive resin layer and containing nickel and a second plating layer disposed on the first plating layer and containing tin.

6. The multilayer ceramic electronic component of claim 1, wherein the ceramic body includes an active layer in which the internal electrodes are alternately stacked with each of the dielectric layers interposed therebetween to thereby form capacitance, an upper cover part disposed on an upper portion of the active layer, and a lower cover part disposed on a lower portion of the active layer and having a thickness greater than that of the upper cover part.

7. A multilayer ceramic electronic component comprising: a ceramic body including a plurality of internal electrodes and a plurality of dielectric layers; and an external electrode including an electrode layer disposed on an outer surface of the ceramic body to be connected to the internal electrodes, a conductive resin layer disposed on the electrode layer and containing a plurality of metal particles and a base resin, and a plating layer disposed on the conductive resin layer, wherein in the case that a point at which among the internal electrodes, an outermost internal electrode in the stacking direction and the electrode layer are connected to each other is defined as P, a shortest distance from the point P to an outer surface of the external electrode is defined as a, a point at which a virtual straight line forming the shortest distance contacts the outer surface of the electrode layer is defined as Q, a point at which the straight line contacts an outer surface of the conductive resin layer is defined as R, a distance between the points P and Q is defined as c, a distance between the points Q and R is defined as b, and a sum of distances of regions of the straight line crossing the metal particles is defined as bm, $0.250 \leq \{(2b+c)/a\} \times \{1-(bm/b)\}^{1/2} \leq 0.605$ is satisfied.

8. The multilayer ceramic electronic component of claim 7, wherein a corner portion of the conductive resin layer has a thickness of 1.7 μm or more.

9. The multilayer ceramic electronic component of claim 7, wherein the internal electrodes include first and second internal electrodes having one ends alternately exposed to both end surfaces of the ceramic body opposing each other.

10. The multilayer ceramic electronic component of claim 7, wherein the metal particles have a spherical or flake shape.

11. The multilayer ceramic electronic component of claim 7, wherein the plating layer includes a first plating layer disposed on the conductive resin layer and containing nickel and a second plating layer disposed on the first plating layer and containing tin.

12. The multilayer ceramic electronic component of claim 7, wherein the ceramic body includes an active layer in which the internal electrodes are alternately stacked with each of the dielectric layers interposed therebetween to thereby form capacitance, an upper cover part disposed on an upper portion of the active layer, and a lower cover part disposed on a lower portion of the active layer and having a thickness greater than that of the upper cover part.

13. A multilayer ceramic electronic component comprising:

a ceramic body including an active layer including a plurality of internal electrodes disposed therein with each of the dielectric layers interposed therebetween to thereby form capacitance, an upper cover part disposed on an upper portion of the active layer, and a lower cover part disposed on a lower portion of the active layer and having a thickness greater than that of the upper cover part; and an external electrode including an electrode layer disposed on an outer surface of the ceramic body to be connected to the internal electrodes, a conductive resin layer disposed on the electrode layer and containing a plurality of metal particles and a base resin, and a plating layer disposed on the conductive resin layer, wherein in the case that a shortest distance from a point at which among the internal electrodes, an outermost internal electrode in the stacking direction and the electrode layer are connected to each other to an outer surface of the external electrode is defined as a, a virtual straight line forming the shortest distance is present, a distance of a region of the straight line passing through the conductive resin layer is defined as b, a distance of a region of the straight line passing through the electrode layer is defined as c, and a sum of distances of regions of the straight line passing through the metal particles contained in the conductive resin layer is defined as bm, $0.250 \leq \{(2b+c)/a\} \times \{1-(bm/b)\}^{1/2} \leq 0.605$ is satisfied.

* * * * *